US012795342B2

(12) United States Patent
Lan

(10) Patent No.: US 12,795,342 B2
(45) Date of Patent: Nov. 10, 2026

(54) SYSTEMS AND METHODS FOR ROUTING WIRELESS EMERGENCY CALLS TO AN APPROPRIATE PUBLIC SAFETY ANSWER POINT

(71) Applicant: T-MOBILE INNOVATIONS LLC, Overland Park, KS (US)

(72) Inventor: Wei-Ming Lan, Morrisville, NC (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 163 days.

(21) Appl. No.: 18/822,936

(22) Filed: Sep. 3, 2024

(65) Prior Publication Data

US 2026/0067661 A1 Mar. 5, 2026

(51) Int. Cl.
*H04W 4/90* (2018.01)
*H04W 4/029* (2018.01)

(52) U.S. Cl.
CPC ............ *H04W 4/90* (2018.02); *H04W 4/029* (2018.02)

(58) Field of Classification Search
CPC ....... H04W 76/50; H04W 64/00; H04W 4/90; H04W 4/029; H04W 4/02; H04W 4/023; H04W 4/38; H04W 48/04; H04W 28/0226; H04W 84/042; H04W 88/16; H04W 88/08; G08B 25/016; G08B 25/10; G08B 27/006; G08B 21/02; G08B 21/0211; G08B 21/0453; G08B 21/0288; G08B 21/0423; G08B 21/043; G08B 21/0446; G08B 21/0469; G08B 21/0476; G08B 27/001; G08B 13/19658; G08B 21/0205; G08B 21/0227; G08B 21/088; G08B 27/00; H04L 67/12; H04L 12/189; H04L 12/1895; H04L 51/222; H04L 51/58; H04L 63/107
See application file for complete search history.

(56) References Cited

U.S. PATENT DOCUMENTS

| | | | | |
|---|---|---|---|---|
| 2007/0224941 | A1* | 9/2007 | Yoshioka | G08B 25/016 455/66.1 |
| 2012/0309340 | A1 | 12/2012 | Ray | |
| 2018/0054721 | A1* | 2/2018 | Choe | H04M 3/5116 |
| 2021/0289334 | A1 | 9/2021 | Martin et al. | |
| 2021/0377715 | A1* | 12/2021 | Lan | H04W 4/029 |
| 2023/0188944 | A1* | 6/2023 | Lan | G01S 19/42 455/456.1 |

(Continued)

OTHER PUBLICATIONS

Non-Final Office Action received for U.S. Appl. No. 18/822,940, mailed on Jun. 26, 2026, 14 pages.

(Continued)

*Primary Examiner* — Nimesh Patel
(74) *Attorney, Agent, or Firm* — SHOOK, HARDY & BACON L.L.P.

(57) ABSTRACT

Systems and methods are provided for routing wireless emergency calls to an appropriate public safety answer point (PSAP). When an emergency call is initiated by user equipment (UE), an age of the cached location of the UE is determined. Based on the age of the cached location, a variable delay timer is assigned for communicating a session information protocol (SIP) INV message comprising a location of the UE to a gateway. The location, in various aspects either the cached location or the fresh location, is communicated to the gateway, enabling the UE to communicate with the PSAP.

20 Claims, 4 Drawing Sheets

(56) References Cited

U.S. PATENT DOCUMENTS

| | | | | |
|---|---|---|---|---|
| 2023/0209322 | A1* | 6/2023 | Shrivastava ............ | H04W 4/90<br>455/404.2 |
| 2024/0422266 | A1* | 12/2024 | Beckwith .......... | H04M 3/42348 |

OTHER PUBLICATIONS

Non-Final Office Action received for U.S. Appl. No. 18/822,944, mailed on Aug. 5, 2026, 9 pages.

* cited by examiner

SYSTEMS AND METHODS FOR ROUTING WIRELESS EMERGENCY CALLS TO AN APPROPRIATE PUBLIC SAFETY ANSWER POINT

SUMMARY

Embodiments of the technology described herein are directed to, among other things, systems and methods for routing wireless emergency calls to an appropriate public safety answer point (PSAP). More particularly, when an emergency call is initiated by user equipment (UE), an age of the cached location of the UE is determined. Based on the age, a delay timer is assigned for communicating a session information protocol INV message comprising a fresh location of the UE to a gateway. For example, if the age of the cached location is less than 30 seconds, the cached location may be sent to the gateway. In another example, if the age of the cached location is greater than or equal to 30 seconds and less than 5 minutes, a delay timer of 3 seconds may be assigned before the UE communicates the SIPINV message to the gateway. In yet another example, if the age of the cached location is greater than or equal to 5 minutes and less than 10 minutes, a delay timer of 4 seconds may be assigned before the UE communicates the SIPINV message to the gateway. In another example, if the age of the cached location is greater than 10 minutes, a delay timer of 5 seconds may be assigned before the UE communicates the SIPINV message to the gateway. After the location is communicated to the gateway, the UE is able to communicate with the appropriate PSAP.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein.

DETAILED DESCRIPTION

Figure 1:
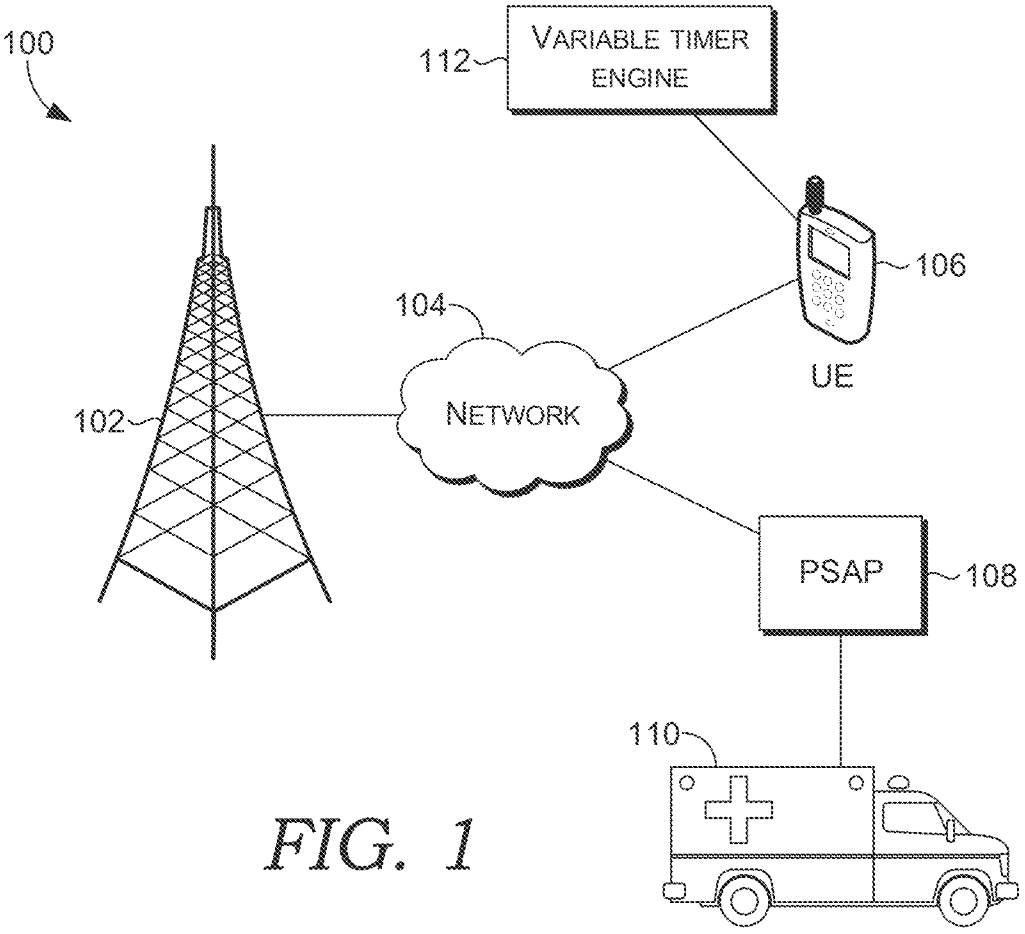
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Receive Power
RSRQ Reference Signal Receive Quality
RSSI Received Signal Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, $32^{nd}$ Edition (2022). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB). In this regard, typically only one active uplink connection can occur per frequency. The base station may include one or more sectors served by individual transmitting/receiving components associated with the base station (e.g., antenna arrays controlled by an eNodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service.

The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network.

For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE may be, in an embodiment, similar to device 500 described herein with respect to FIG. 5.

Emergency 911 calls are routed based on UE location to increase the chance of the call reaching correct PSAP. This ensures emergency calls are not delayed due to being transferred to another PSAP. As such, a UE needs to self-locate and deliver the location to the Gateway Mobile Location Centre (GMLC) before a call can be routed to the PSAP. For clarity, the GMLC contains functionality required to support location-based service (LBS). Currently, the objective of mobile network providers to reach the PSAP in the shortest time as possible without considering if the call reaches the correct or appropriate PSAP.

For example, a PSAP boundary may cut through a coverage area supported by a particular node. In this scenario, a first PSAP may be outside the coverage area while a second PSAP is within the coverage area. Two UEs in the same coverage area may be on opposite sides of the PSAP boundary. The first UE may be within the first PSAP boundary and the second UE may be within the second PSAP boundary. Currently, a mobile network provider routes both UEs to the second PSAP within the coverage area, even though the first UE should be routed to the first PSAP. In this scenario, emergency services are delayed to the first UE because the call will have to be rerouted from the second PSAP to the first PSAP.

A Presence Information Data Format-Location Object (PIDF-LO) in a SIPINV message is utilized deliver a UE location and enable location-based routing (LBR). However, SIPINV messages are typically communicated every two to three seconds, so there may not be enough time for the UE to generate a fresh location. If the fresh location is not available, the UE may need to communicate a cached location, if available, or it is left with no location to communicate in the SIPINV message. Current real world data shows only 3-5% of the wireless emergency calls have a fresh location.

The present disclosure is directed to systems, methods, and computer readable media that systems and methods for routing wireless emergency calls to the appropriate PSAP. More particularly, a variable timer slightly delays the time to send a SIPINV message so a fresh location can become available if the age of a cached location is older than 30 seconds or if a cached location is not available. In operation, a delay timer of 3 seconds may be assigned if the age of the cached location is greater than or equal to 30 seconds and less than 5 minutes, a delay timer of 4 seconds may be assigned if the age of a cached location is greater than or equal to 5 minutes and less than 10 minutes, or a delay timer of 5 seconds may be assigned if the age of a cached location is greater than 10 minutes. In practice, the timer is a maximum wait time for a fresh location. If the fresh location is acquired prior to the delay timer expiring, the SIPINV comprising the fresh location is communicated immediately to the gateway. In this way, the UE can communicate with the PSAP as soon as possible, while ensuring a transfer to a different PSAP is not needed.

In a first aspect of the present invention, computer-readable media is provided, the computer-readable media having computer-executable instructions embodied thereon that, when executed, perform a method for routing a wireless emergency call to an appropriate a public safety answer point (PSAP). The method includes initiating, at the UE, an emergency call. The method also includes determining an age of a cache location of the UE. The method further includes, based on the determining, assigning a delay timer for communicating a SIPINV message comprising a location of the UE to the gateway. Based on the location communicated to the gateway, the UE is enabled to communicate with the PSAP.

In a second aspect of the present invention, a method for routing a wireless emergency call to an appropriate a public safety answer point (PSAP). The method includes initiating, at the UE, an emergency call. The method also includes determining an age of a cache location of the UE. The method further includes, based on the determining, assigning a delay timer for communicating a SIPINV message comprising a location of the UE to the gateway. Based on the location communicated to the gateway, the UE is enabled to communicate with the PSAP.

In a third aspect of the present invention, a system for routing a wireless emergency call to an appropriate a public safety answer point (PSAP) is provided. The system comprises a node configured to wirelessly communicate with one or more UEs. The system also comprises a UE of the one or more UEs that: initiates an emergency call; determines an age of a cached location of the UE; based on the determining, assigning a delay timer for communicating a SIPINV message comprising a location of the UE to a gateway; and based on the location communicated to the gateway, the UE is enabled to communicate with the PSAP.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 5:
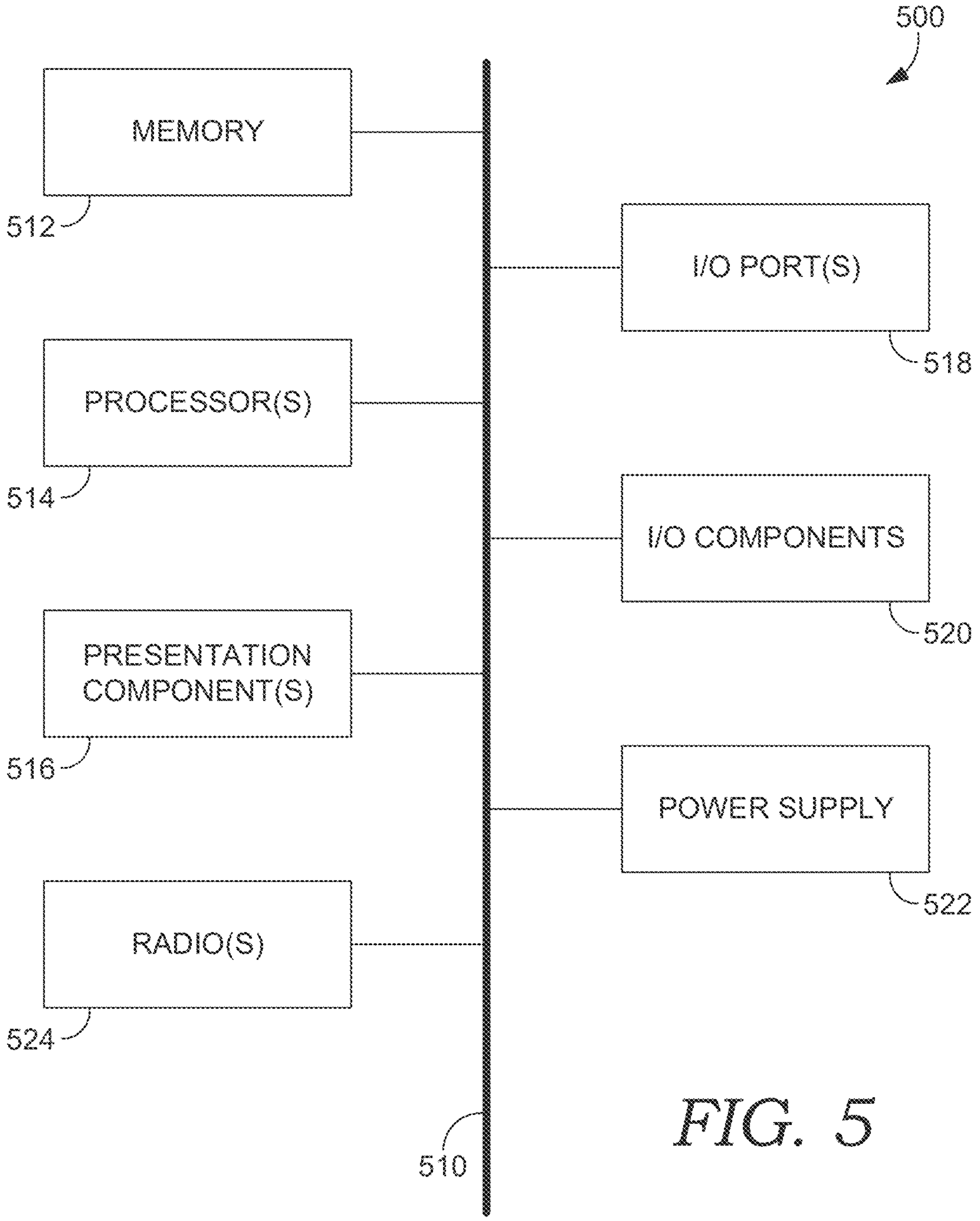
FIG. 5 depicts an example computing environment suitable for use in implementation of the present disclosure.

A network cell may comprise a base station to facilitate wireless communication between a communications device within the network cell, such as communications device 500 described with respect to FIG. 5, and a network. As shown in FIG. 1, a communications device may be a UE 106. In the network environment 100, UE 106 may communicate with other devices, such as mobile devices, servers, etc. The UE 106 may take on a variety of forms, such as a personal computer, a laptop computer, a tablet, a netbook, a mobile phone, a Smart phone, a personal digital assistant, or any other device capable of communicating with other devices. For example, the UE 106 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 106 comprises a wireless or mobile device with which a wireless telecommunication network(s) can be utilized for communication (e.g., voice and/or data communication). In this regard, the UE 106 can be any mobile computing device that communicates by way of, for example, a 5G network.

The UE 106 may utilize network 104 to communicate with other computing devices (e.g., mobile device(s), a server(s), a personal computer(s), etc.). In embodiments, network 104 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 104 may include multiple networks, as well as being a network of networks, but is shown in more simple form so as to not obscure other aspects of the present disclosure. Network 104 may be part of a telecommunications network that connects subscribers to their immediate service provider. In embodiments, network 104 is associated with a telecommunications provider that provides services to user devices, such as UE 106. For example, network 104 may provide voice services to user devices or corresponding users that are registered or subscribed to utilize the services provided by a telecommunications provider. It is contemplated network 104 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like.

The network environment 100 may include a database (not shown). The database may be similar to the memory component 512 in FIG. 5 and can be any type of medium that is capable of storing information. The database can be any collection of records (e.g., FPLMN list and/or metrics from UEs). In one embodiment, the database includes a set of embodied computer-executable instructions that, when executed, facilitate various aspects disclosed herein. These embodied instructions will variously be referred to as "instructions" or an "application" for short.

As previously mentioned, the UE 106 may communicate with other devices by using a base station, such as base station 102. In embodiments, base station 102 is a wireless communications station that is installed at a fixed location, such as at a radio tower, as illustrated in FIG. 1. The radio tower may be a tall structure designed to support one or more antennas for telecommunications and/or broadcasting. In other embodiments, base station 102 is a mobile base station. The base station 102 may be an MMU and include gNodeB for mMIMO/5G communications via network 104. In this way, the base station 102 can facilitate wireless communication between UE 106 and network 104.

As stated, the base station 102 may include a radio (not shown) or a remote radio head (RRH) that generally communicates with one or more antennas associated with the base station 102. In this regard, the radio is used to transmit signals or data to an antenna associated with the base station 102 and receive signals or data from the antenna. Communications between the radio and the antenna can occur using any number of physical paths. A physical path, as used herein, refers to a path used for transmitting signals or data.

As such, a physical path may be referred to as a radio frequency (RF) path, a coaxial cable path, cable path, or the like.

The antenna is used for telecommunications. Generally, the antenna may be an electrical device that converts electric power into radio waves and converts radio waves into electric power. The antenna is typically positioned at or near the top of the radio tower as illustrated in FIG. 1. Such an installation location, however, is not intended to limit the scope of embodiments of the present invention. The radio associated with the base station 102 may include at least one transceiver configured to receive and transmit signals or data.

In practice, a user of a UE 106 may need emergency services. The user places a call to emergency services (e.g., 911) and the base station 102 facilitates wireless communication between UE 106 and PSAP 108 via the network. However, in order for the gateway corresponding to the base station 102 to route the emergency call from the UE 106 to the appropriate PSAP 108, the age of the cached location must first be determined. Based on the age of the cached location, a delay timer for communicating a SIPINV message comprising a location of the UE 106 to the gateway may be assigned. Once the location is communicated to the gateway, the UE 106 is enabled to communicate with the PSAP 108.

Continuing, the network environment 100 may further include a variable timer engine 112. The variable timer engine 112 may be configured to, among other things, assign the delay timer for communicating the SIPINV message comprising the location of the UE 106 to the gateway, in accordance with the present disclosure. Though variable timer engine 112 is illustrated as a component of UE 106 in FIG. 1, it may be a standalone device (e.g., a server having one or more processors), a service provided via the 5G network 104, a component of the base station 102, or may be remotely located.

Figure 2:
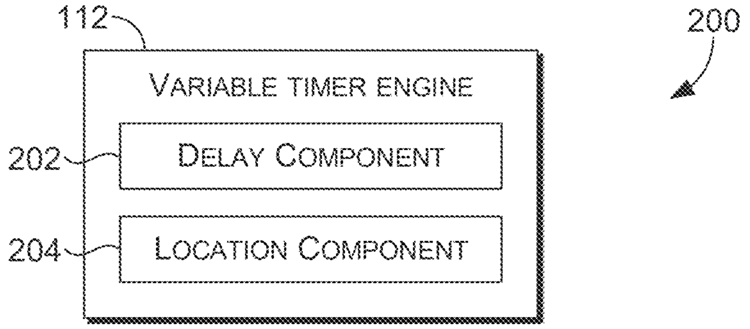
FIG. 2 illustrates a diagram of a variable timer engine, in accordance with aspects herein.

Referring now to FIG. 2, the variable timer engine 112 may include, among other things, delay component 202 and location component 204. The variable timer engine 112 may receive, among other things, data from user devices, such as UE 106, or PSAP 108 within a network cell associated with a particular base station 102. Additionally or alternatively, the variable timer engine 112 may receive, among other things, data from base station 102, such as data from a gNodeB or eNodeB or from a plurality of base stations.

Delay component 202 generally assigns a delay timer for communicating a SIPINV message comprising a fresh location of the UE 106 to a gateway. For example, if the age of the cached location is less than 30 seconds, the delay component 202 may not assign a delay timer and the cached location may be sent to the gateway. In another example, if the age of the cached location is greater than or equal to 30 seconds and less than 5 minutes, the delay component 202 may assign a delay timer of 3 seconds before the UE communicates the SIPINV message to the gateway. In yet another example, if the age of the cached location is greater than or equal to 5 minutes and less than 10 minutes, the delay component 202 may assign a delay timer of 4 seconds before the UE communicates the SIPINV message to the gateway. In another example, if the age of the cached location is greater than 10 minutes, the delay component 202 may assign a delay timer of 5 seconds before the UE communicates the SIPINV message to the gateway.

Once the fresh location of the UE has been acquired (or the age of the cached location is determined to be less than 30 seconds), location component 204 generally communicates the SIPINV message comprising the location (either the fresh location or the cached location) of the UE to the gateway corresponding to the base station. Once the location is communicated to the gateway, the UE is enabled to communicate with the PSAP.

Figure 3:
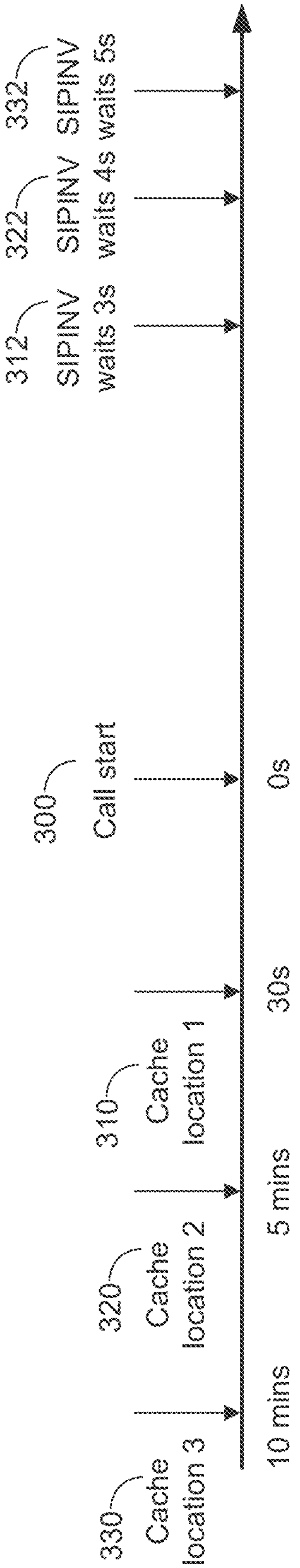
FIG. 3 illustrates an example timeline for a variable delay timer in sending SIPINV messages, in accordance with some aspects of the technology described herein.

In FIG. 3, an example timeline is illustrated for a variable delay timer in sending SIPINV messages, in accordance with some aspects of the technology described herein. Initially, a wireless emergency call is initiated 300. As shown, if the age of the cached location 310 is between 30 seconds and 5 minutes, a delay timer of 3 seconds 312 is assigned to the UE prior to communicating the SIPINV message to the gateway. If the age of the cached location 320 is greater than or equal to 5 minutes and less than 10 minutes, a delay timer of 4 seconds 322 is assigned to the UE prior to communicating the SIPINV message to the gateway. If the age of the cached location 330 is greater than or equal to 10 minutes, a delay timer of 5 seconds 332 is assigned to the UE prior to communicating the SIPINV message to the gateway.

Figure 4:
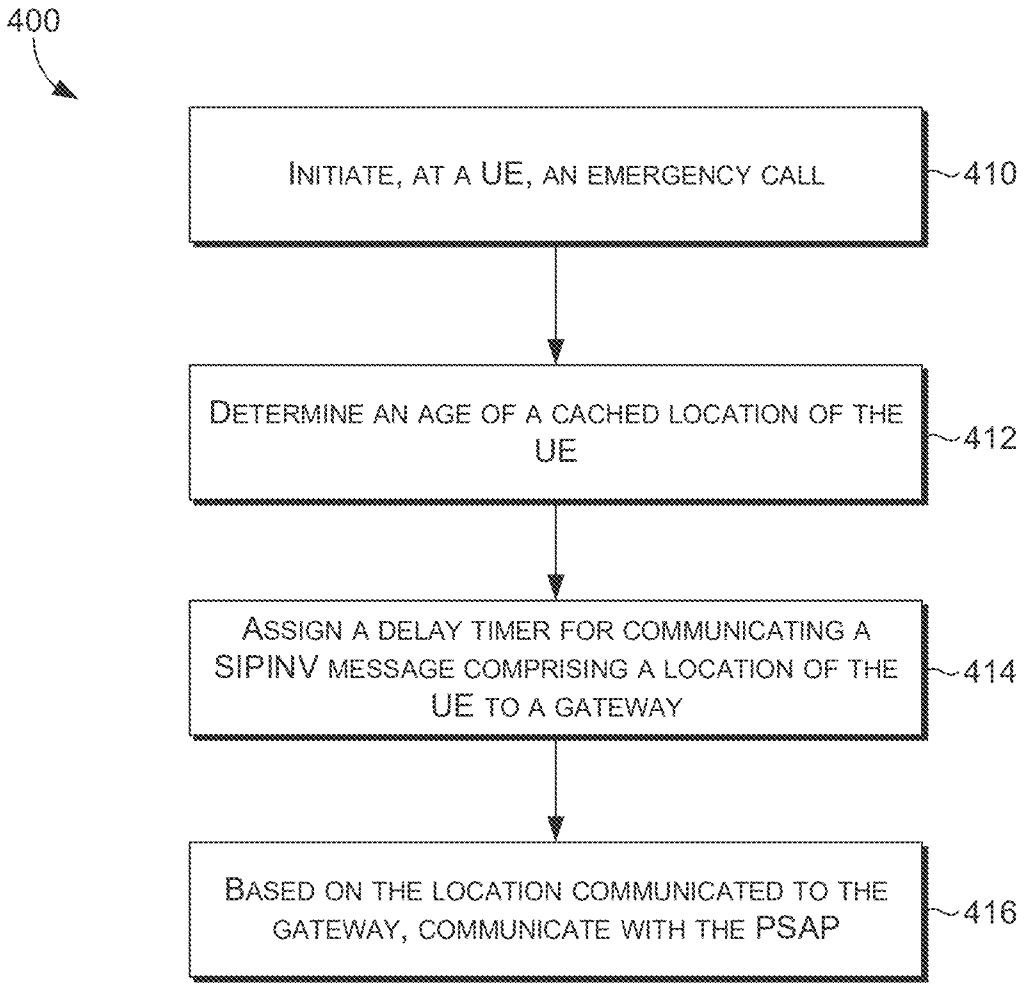
FIG. 4 is a flow diagram of an example method for routing wireless emergency calls to an appropriate public safety answer point (PSAP)., in accordance with some aspects of the technology described herein.

Referring to FIG. 4, a flow diagram is provided depicting a method for routing an emergency call to an appropriate a public safety answer point (PSAP), according to aspects of the technology described herein. Method 400 may be performed by any computing device (such as computing device described with respect to FIG. 5) with access to a variable timer engine (such as the one described with respect to FIGS. 1 and 2) or by one or more components of the network environment described with respect to FIG. 1 (such as UE 106, base station 102, or variable timer engine 112). Initially, at 410, a UE initiates an emergency call.

At step 412, an age of a cached location of the UE is determined. In various aspects, the age of the cached location of the UE is determined to be less than 30 seconds, greater than or equal to 30 seconds and less than 5 minutes, greater than or equal to 5 minutes and less than 10 minutes, or greater than or equal to 10 minutes.

At step 414, based on the determining, a delay timer for communicating a SIPINV message comprising a fresh location of the UE to a gateway is assigned. For example, if the age of the cached location is less than 30 seconds, the cached location may be sent to the gateway. In another example, if the age of the cached location is greater than or equal to 30 seconds and less than 5 minutes, a delay timer of 3 seconds may be assigned before the UE communicates the SIPINV message to the gateway. In yet another example, if the age of the cached location is greater than or equal to 5 minutes and less than 10 minutes, a delay timer of 4 seconds may be assigned before the UE communicates the SIPINV message to the gateway. In another example, if the age of the cached location is greater than 10 minutes, a delay timer of 5 seconds may be assigned before the UE communicates the SIPINV message to the gateway.

In some aspects, the fresh location of the UE may be acquired prior to the delay timer expiring. In this example, the delay timer is terminated and the fresh location is the location of the UE that is communicated to the gateway as soon as the fresh location is acquired. In other aspects, a fresh location of the UE may not be acquired prior to the delay timer expiring. In this example, the cached location is the location of the UE that is communicated to the gateway.

At step 416, based on the location communicated to the gateway, the UE is enabled to communicate with the PSAP.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and nonvolatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. In aspects, the computing device 500 may be a UE/WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more computer-readable media having computer-executable instructions embodied thereon that, when executed, perform a method for routing a wireless emergency call to an appropriate public safety answer point (PSAP), the method comprising:

initiating, at a UE, an emergency call;

determining an age of a cached location of the UE;

based on the determining, assigning a delay timer for communicating a SIPINV message comprising a location of the UE to a gateway; and based on the location communicated to the gateway, the UE is enabled to communicate with the PSAP.

2. The media of claim 1, wherein the method further comprises acquiring a fresh location of the UE prior to the delay timer expiring.

3. The media of claim 2, wherein the fresh location is the location of the UE communicated to the gateway.

4. The media of claim 2, wherein the method further comprises terminating the delay timer and communicating the location of the UE to the gateway as soon as the fresh location is acquired.

5. The media of claim 4, wherein the method further comprises not acquiring the fresh location of the UE prior to the delay timer expiring.

6. The media of claim 5, wherein the cached location is the location of the UE communicated to the gateway.

7. The media of claim 1, wherein the method further comprises upon determining the age of the cached location is between 30 seconds and 5 minutes, assigning the delay timer of 3 seconds.

8. The media of claim 1, wherein the method further comprises upon determining the age of the cached location is greater than or equal to 5 minutes and less than 10 minutes, assigning the delay timer of 4 seconds.

9. The media of claim 1, wherein the method further comprises upon determining the age of the cached location is greater than or equal to 10 minutes, assigning the delay timer of 5 seconds.

10. A method for routing a wireless emergency call to an appropriate public safety answer point (PSAP), the method comprising:

initiating, at a UE, an emergency call;

determining an age of a cached location of the UE;

based on the determining, assigning a delay timer for communicating a SIPINV message comprising a location of the UE to a gateway; and based on the location communicated to the gateway, the UE is enabled to communicate with the PSAP.

11. The method of claim 10, further comprising acquiring a fresh location of the UE prior to the delay timer expiring.

12. The method of claim 11, wherein the fresh location is the location of the UE communicated to the gateway.

13. The method of claim 11, further comprising terminating the delay timer and communicating the location of the UE to the gateway as soon as the fresh location is acquired.

14. The method of claim 10, further comprising not acquiring a fresh location of the UE prior to the delay timer expiring.

15. The method of claim 14, wherein the cached location is the location of the UE communicated to the gateway.

16. The method of claim 10, further comprising upon determining the age of the cached location is between 30 seconds and 5 minutes, assigning the delay timer of 3 seconds.

17. The method of claim 10, further comprising upon determining the age of the cached location is greater than or equal to 5 minutes and less than 10 minutes, assigning the delay timer of 4 seconds.

18. The method of claim 10, further comprising upon determining the age of the cached location is greater than or equal to 10 minutes, assigning the delay timer of 5 seconds.

19. A system for routing a wireless emergency call to an appropriate public safety answer point (PSAP), the system comprising:

a node configured to wirelessly communicate with one or more UEs; and a UE of the one or more UEs that:

(1) initiates an emergency call;

(2) determines an age of a cached location of the UE;

(3) based on the determining, assigns a delay timer for communicating a SIPINV message comprising a location of the UE to a gateway corresponding to the node; and (4) based on the location communicated to the gateway, the UE is enabled to communicate with the PSAP.

20. The system of claim 19, further comprising one of:

1) acquiring a fresh location of the UE prior to the delay timer expiring; terminating the delay timer; and communicating the location of the UE to the gateway, wherein the fresh location is the location; or 2) not acquiring the fresh location of the UE prior to the delay timer expiring; and communicating the location of the UE to the gateway, wherein the cached location is the location.

* * * * *